No. 635,344. Patented Oct. 24, 1899.
M. J. OWENS.
MACHINE FOR BLOWING GLASS.
(Application filed Dec. 30, 1898.)
(No Model.)
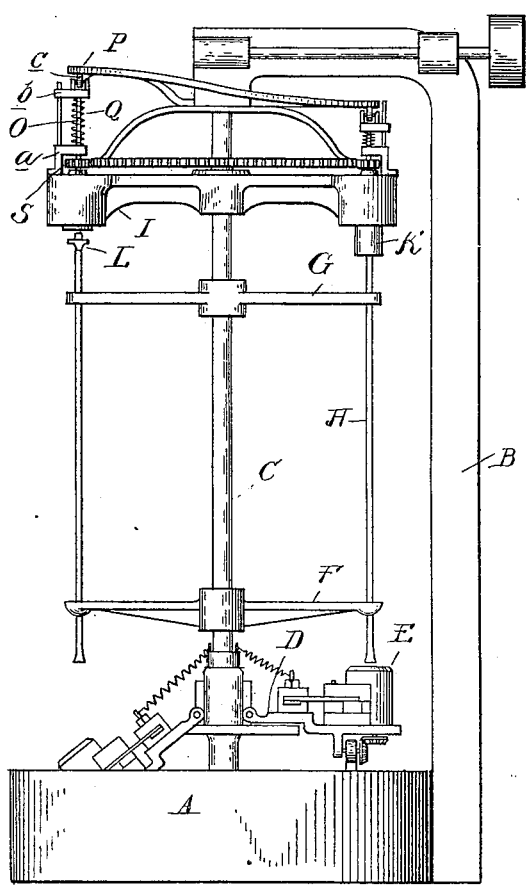
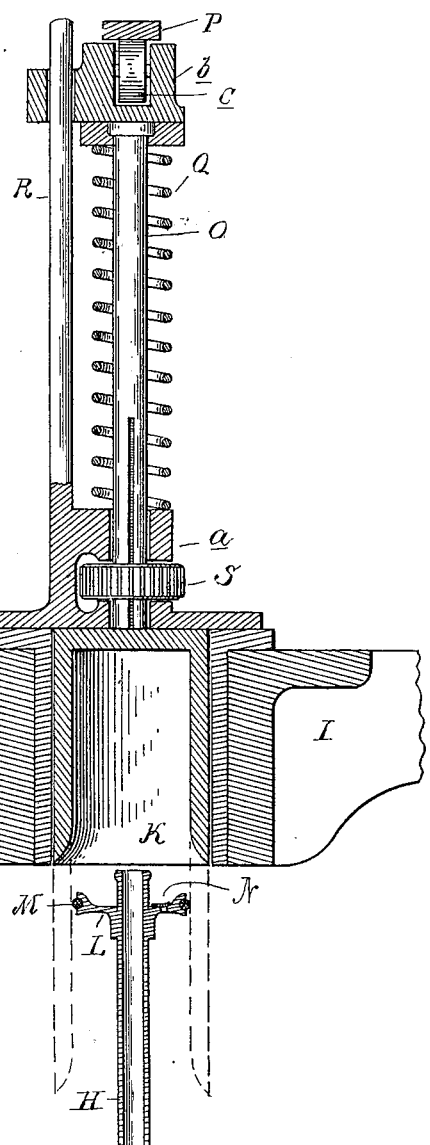
Witnesses
A. L. Hobby
H. C. Smith
Inventor
Michael J. Owens
By Attys.

UNITED STATES PATENT OFFICE.

MICHAEL J. OWENS, OF TOLEDO, OHIO, ASSIGNOR TO THE TOLEDO GLASS COMPANY, OF SAME PLACE.

MACHINE FOR BLOWING GLASS.

SPECIFICATION forming part of Letters Patent No. 635,344, dated October 24, 1899.

Application filed December 30, 1898. Serial No. 700,755. (No model.)

*To all whom it may concern:*

Be it known that I, MICHAEL J. OWENS, a citizen of the United States, residing at Toledo, in the county of Lucas and State of Ohio, have invented certain new and useful Improvements in Machines for Blowing Glass, of which the following is a specification, reference being had therein to the accompanying drawings.

The invention consists in a machine for blowing glass, and particularly in the construction and arrangement of the devices for effecting the blowing—that is, supplying the air-pressure and regulating the same—all as more fully hereinafter described, and particularly pointed out in the claims.

In the drawings, Figure 1 is an elevation of a machine of known type embodying my improvements. Fig. 2 is an enlarged section through one of the pumps and connections, showing the blowpipe supported in operative relation thereto.

A is the base of the machine, B is a standard, and C is a shaft supported in the base and standard and driven by any suitable means and carrying with it the mold-carriages D, each having a sectional mold E thereon, the arms F and G, which form supports for the blowpipes H, and the arms or head I.

The parts thus far described are of known construction and are normally constructed so that as the molds travel they are opened and closed and at one point in their travel are dipped into a tank, where they are wetted and cooled.

In these machines as heretofore made the air-supply has been obtained from a source of air under pressure (such as a pump) at a distance and has been conducted by passages and pipes to the machine and there distributed to the various blowpipes and controlled by valves. This either requires a motor and pump on each machine with connecting-pipes or else a central pumping-station and pipes to the various machines. By my improvement each machine has its own air-supplying or air-compressing device and the air-supply pipes and ducts are avoided, the machine simplified, and valves omitted.

On the outer ends of the arms I are bearings for the cylinder K, which is of a size to fit over the end of the blowpipe.

To get the desired capacity, I may enlarge the end of the blowpipe—as, for instance, by the disk L, and to make a tight joint place the packing M around this disk.

O is a stem which is secured to the cylinder K and which passes through suitable guideways in the bracket $a$ and carries on its top a block $b$, having an antifriction-roller $c$ bearing against stationary camway P.

Between the bracket and the block $b$ is a spring Q, which sustains the weight of the cylinder and stem, the cam causing it to move downward as the arm I moves and the spring lifting it as soon as the shape of the cam permits. Thus as the machine moves the cylinder is raised and lowered.

At the time the blowpipe is put in the machine the cylinder is up. As the machine travels it is lowered, first to engage the blowpipe and then by its further movement to compress the air for blowing the article, and by its degree of movement it determines the amount of pressure. After the blowing the spring lifts the cylinder from the blowpipe, so that it may be detached and a new one inserted.

I show a guide-pin R for steadying the movement of the block $b$ and also a pinion S on the stem O with a spine engagement, so that while permitting the sliding movement of the stem it will be rotated.

To prevent the collapsing of the blown article by the suction of the cylinder when lifted, I provide a valve N, which opens to allow the cylinder to fill with air.

It will be seen in this construction I have in effect two devices in the cylinder K, that cylinder, combined with the devices for causing it to couple with the blowpipe, forming, in effect, a coupler or air connection between the interior of the cylinder and the blowpipe, and after the coupling is effected the pumping function or action of the cylinder commences. While I have shown these two devices and functions combined in a single thing, I do not desire to be limited to the same, as I believe my invention is broad enough to cover a construction in which the coupling devices and the air-compressing devices are separate means, and the claims are intended to be drawn to cover such construction.

What I claim as my invention is—

1. In a glass-blowing machine, a movable mold, a support for the blowpipe movable in unison with the mold, a blowpipe, an air-supply device and an air-compressing device, said blowpipe detachably supported in operative relation to the mold, the air-supply device, and the air-compressing device movable with the blowpipe.

2. In a glass-blowing machine, a traveling support for the blowpipe and mold, the blowpipe and air-compressing means moving with the traveling support and means for connecting and disconnecting the blowpipe with the air-compressing means.

3. In a glass-blowing machine, a mold, a support for a blowpipe and an air connection for the blowpipe adapted to be moved in unison, a blowpipe adapted to be supported in operative relation to the air connection and mold, and an air-compressing device carried with the air connection and adapted to produce and supply to the blowpipe air at varying pressure.

4. In a glass-blowing machine, a support for the blowpipe, a coupler having a closed top adapted to connect with the blowpipe, and means for moving it upon the blowpipe after the coupling to compress the air for blowing.

In testimony whereof I affix my signature in presence of two witnesses.

MICHAEL J. OWENS.

Witnesses:
   J. P. JONES,
   T. N. MILLER.